United States Patent
Hong et al.

(10) Patent No.: US 9,575,736 B2
(45) Date of Patent: Feb. 21, 2017

(54) ADVANCED INTERACTIVE COMMAND-LINE FRONT-END FOR GRAPH ANALYSIS SYSTEMS

(71) Applicant: Oracle International Corporation, Redwood Shores, CA (US)

(72) Inventors: Sungpack Hong, Palo Alto, CA (US); Korbinian Schmid, Munich (DE); Felix Kaser, San Francisco, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/805,882

(22) Filed: Jul. 22, 2015

(65) Prior Publication Data

US 2017/0024192 A1    Jan. 26, 2017

(51) Int. Cl.
*G06F 9/45* (2006.01)
*G06F 9/44* (2006.01)

(52) U.S. Cl.
CPC ............ *G06F 8/41* (2013.01); *G06F 8/443* (2013.01); *G06F 8/30* (2013.01); *G06F 8/441* (2013.01); *G06F 8/445* (2013.01); *G06F 9/4425* (2013.01)

(58) Field of Classification Search
CPC . G06F 8/30; G06F 8/433; G06F 8/443; G06F 8/445; G06F 8/441; G06F 9/4425
See application file for complete search history.

(56) References Cited

U.S. PATENT DOCUMENTS

| | | | |
|---|---|---|---|
| 6,883,161 B1* | 4/2005 | Chovin et al. | 717/109 |
| 7,478,375 B1* | 1/2009 | Kersters | G06F 8/316 |
| | | | 717/144 |
| 8,910,134 B2* | 12/2014 | Hong | G06F 8/443 |
| | | | 717/151 |

(Continued)

OTHER PUBLICATIONS

Hong et al., "Green-Marl: A DSL for Easy and Efficient Graph Analysis", 2012 ACM, ASPLOS'12, Mar. 3-7, 2012, London, England, UK, pp. 349-362; <http://dl.acm.org/citation.cfm?id=2151013&CFID=747876788&CFTOKEN=26566121>.*

(Continued)

*Primary Examiner* — Thuy Dao
*Assistant Examiner* — Ben C Wang
(74) *Attorney, Agent, or Firm* — Hickman Palermo Becker Bingham LLP

(57) ABSTRACT

Systems and methods for interactive front-end graph analysis are provided herein. According to one embodiment, a front-end application receives, from a compiler, first meta-information for a particular graph analysis procedure, where the first meta-information identifies a set of input parameters for passing graph information to the particular graph analysis procedure. The front-end application registers, using the first meta-information, the particular graph analysis procedure as an available command. The front-end application also receives second meta-information that identifies, for each respective graph object of a set of one or more graph objects, a respective set of graph characteristics. In response to receiving a request to apply the particular graph analysis procedure to the set of one or more graph objects, the front-end application enforces a set of one or more constraints based on the first meta-information and the second meta-information.

20 Claims, 7 Drawing Sheets

(56) References Cited

U.S. PATENT DOCUMENTS

| | | | |
|---|---|---|---|
| 8,949,811 B2* | 2/2015 | Murthy | G06F 8/315 717/157 |
| 2005/0278451 A1* | 12/2005 | Yamashita | G06F 8/30 709/229 |
| 2011/0099541 A1* | 4/2011 | Blomstedt | G06F 8/433 717/136 |
| 2011/0138369 A1* | 6/2011 | Chandra | G06F 8/433 717/133 |
| 2011/0276962 A1* | 11/2011 | Chambers | G06F 9/445 718/1 |
| 2013/0097136 A1* | 4/2013 | Goldberg | G06F 17/30289 707/704 |
| 2013/0139135 A1* | 5/2013 | Ditu | G06F 8/441 717/156 |
| 2014/0019949 A1* | 1/2014 | Craymer | G06F 8/443 717/150 |
| 2014/0189665 A1* | 7/2014 | Hong | G06F 8/443 717/151 |
| 2014/0306964 A1* | 10/2014 | Reddish | G06F 8/433 345/440 |
| 2014/0310619 A1* | 10/2014 | Fickenwirth | G06F 3/048 715/762 |
| 2015/0007154 A1* | 1/2015 | Bharadwaj | G06F 9/06 717/160 |
| 2015/0040110 A1* | 2/2015 | Adl-Tabatabai | G06F 8/41 717/148 |
| 2015/0178405 A1* | 6/2015 | Hong et al. | 717/109 |
| 2015/0331683 A1* | 11/2015 | Sevenich et al. | 717/151 |
| 2015/0350324 A1* | 12/2015 | Hu et al. | 717/109 |
| 2015/0355891 A1* | 12/2015 | Angerer | G06F 8/443 717/151 |
| 2016/0019228 A1* | 1/2016 | Hong | G06F 17/30958 707/624 |
| 2016/0048607 A1* | 2/2016 | Raman | G06F 17/30979 707/798 |
| 2016/0062776 A1* | 3/2016 | Stanfill | G06F 8/43 719/331 |
| 2016/0117358 A1* | 4/2016 | Schmid | G06F 17/30386 707/736 |

OTHER PUBLICATIONS

Hong et al., "Simplifying Scalable Graph Processing with a Domain-Specific Language", ADM, CGO'14, Feb. 15-19, 2014, Orlando, FL, USA, pp. 208-218; <http://dl.acm.org/citation.cfm?id=2544162&CFID=747876788&CFTOKEN=26566121>.*

Hong et al., "Early experiences in using a domain-specific language for large-scale graph analysis", ACM, GRADES2013, Jun. 23, 2013, New York, NY, USA, pp. 1-6; <http://dl.acm.org/citation.cfm?id=2484430&CFID=747876788&CFTOKEN=26566121>.*

Perez et al., "Ringo: Interactive Graph Analytics on Big-Memory Machines", ACM, SIGMOD'15, May 2015, pp. 1105-1110 ; <http://dl.acm.org/citation.cfm?id=2735369&CFID=614532957&CFTOKEN=83627961>.*

Bak et al., "A Reference Interpreter for the Graph Programming Language GP 2", Proc. Graphs as Models (GaM 2015), vol. 181 2015., Apr. 2015, p. 48-64; <http://arxiv.org/pdf/1504.02621.pdf>.*

Banerjee et al., "Towards Logical Level Design of Big Data", 2015 IEEE, Jul. 2015, pp. 1665-1671; <http://ieeexplore.ieee.org/stamp/stamp.jsp?tp=&arnumber=7281984>.*

Hong et al., "Green-Marl: a DSL for easy and efficient graph analysis", ACM, ASPLOS'12, Mar. 2012, London, England, UK, pp. 349-362; <http://dl.acm.org/citation.cfm?id=2151013&CFID=668888437&CFTOKEN=98120649>.*

Schiller et al., "Efficient Data Structures for Dynamic Graph Analysis", IEEE, SITIS'15, Nov. 2015, pp. 497-504; <http://ieeexplore.ieee.org/stamp/stamp.jsp?tp=&arnumber=7400608>.*

Sevenich et al., "Using Domain-Specific Languages for Analytic Graph Databases", VLDB Endowment, Sep. 2016, vol. 9, No. 13, New Delhi, India, pp. 1257-1268; <http://www.vldb.org/pvldb/vol9/p1257-sevenich.pdf>.*

Then et al., "The More the Merrier: Efficient Multi-Source Graph Traversal", Proceedings of the VLDB Endowment, vol. 8 Issue 4, Dec. 2014, 12 pages.

* cited by examiner

ADVANCED INTERACTIVE COMMAND-LINE FRONT-END FOR GRAPH ANALYSIS SYSTEMS

CROSS-REFERENCE TO RELATED APPLICATIONS

This application is related to U.S. application Ser. No. 14/805,897, entitled "OPTIMIZATION TECHNIQUES FOR HIGH-LEVEL GRAPH LANGUAGE COMPILERS", the entire contents of which is hereby incorporated by reference as if fully set forth herein.

FIELD OF THE DISCLOSURE

The present disclosure relates, generally, to graph analysis and, more specifically, to front-end applications for interacting with graph data objects.

BACKGROUND

Graph analysis is a subfield of data analysis that generally encompasses systems and methods for analyzing datasets modelled as graphs. The graphs that are analyzed typically organize the underlying dataset into a set of nodes or vertices connected by edges, each of which may have a particular direction. A graph captures fined-grained, arbitrary relationships between different data entities within a dataset. Graphs can be used to model a wide variety of systems and relationships including, without limitation, communication networks, linguistic structures, social networks, data hierarchies, and other physical or virtual systems. By analyzing the relationships captured by a graph, data scientists, applications, or other users can obtain valuable insights about the original dataset.

Graph analysis is often performed in an exploratory manner. For instance, a data scientist may apply different analysis algorithms on the dataset (or a subset of it) in an ad hoc manner until some valuable insight about the dataset is digested. In order to support such exploratory use cases, some traditional database management systems (DBMS) and specialized graph processing systems provide command-line front-ends through which users may submit database queries and procedures. According to one such approach, a general shell application is used to submit standard query language (SQL) statements and Procedural Language/Structured Query Language (PL/SQL) blocks to a database server. Such generalized shell applications allow a user to query and perform standard database operations on graph objects, but generally do not provide any specialized support for performing graph analysis operations. Therefore, the interactivity and operability of such generalized shell applications are significantly limited.

According to another approach, a specialized shell application may be configured to support domain-specific graph languages, such as Gremlin. These shells allow users to submit commands specifically tailored for graph analysis. For instance, the graph language may support pre-defined graph operations for manipulating graph objects via graph traversals. These shells are typically built upon general interpreter frameworks and rely on the type-checking capability of the baseline systems. Generalized type-checking does not capture the nuances of a graph analysis environment, which may lead to unintentional and potentially costly errors on the part of the user. As an example, the user may apply a particular algorithm, intended for a bipartite graph, to a non-bipartite graph. If left unchecked, data may become corrupted or otherwise unreliable during graph analysis. Consequently, the user may incorrectly interpret the data and/or overlook potentially useful insights.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Systems and methods for interactive front-end graph analysis are provided herein. In some embodiments, a front-end application receives, from a compiler, first meta-information for a particular graph analysis procedure, where the first meta-information identifies a set of one or more input parameters for passing graph information to the particular graph analysis procedure. The front-end application registers, using the first meta-information, the particular graph analysis procedure as an available command. The front-end application also receives, from an underlying graph processing system second meta-information that identifies, for each respective graph object of a set of one or more graph objects, a respective set of graph characteristics. In response to receiving a request to apply the particular graph analysis procedure to the set of one or more graph objects, the front-end application enforces a set of one or more constraints based on the first meta-information and the second meta-information.

In some embodiments, the front-end application may further receive, before the first meta-information is received from the compiler, source code for the particular graph analysis procedure. As an example, the user may define a custom graph analysis procedure using a domain-specific language (DSL) string and provide the string to the front-end application. In response to receiving the DSL string for the particular graph analysis procedure, front-end application sends the string to a server. The server then invokes a compiler, which compiles the DSL string to produce an executable binary of the graph analysis procedure as well as meta-information for the procedure. After the custom graph analysis procedure is compiled, the server returns the corresponding meta-information to the front-end application. In response, the front-end application stores the meta-information and allows the custom graph analysis procedure to be invoked as if it were a built-in procedure.

The techniques described herein, including compiling graph analysis procedures, loading the executables, receiving meta-information, enforcing constraints, and running the executable, may all be performed during runtime of the front-end application without the need to restart the application. Thus, a user may perform exploratory graph analysis, including defining and running custom procedures, interactively and efficiently in a manner that does not interrupt data analysis.

Graph Analysis System Architecture

Figure 1:
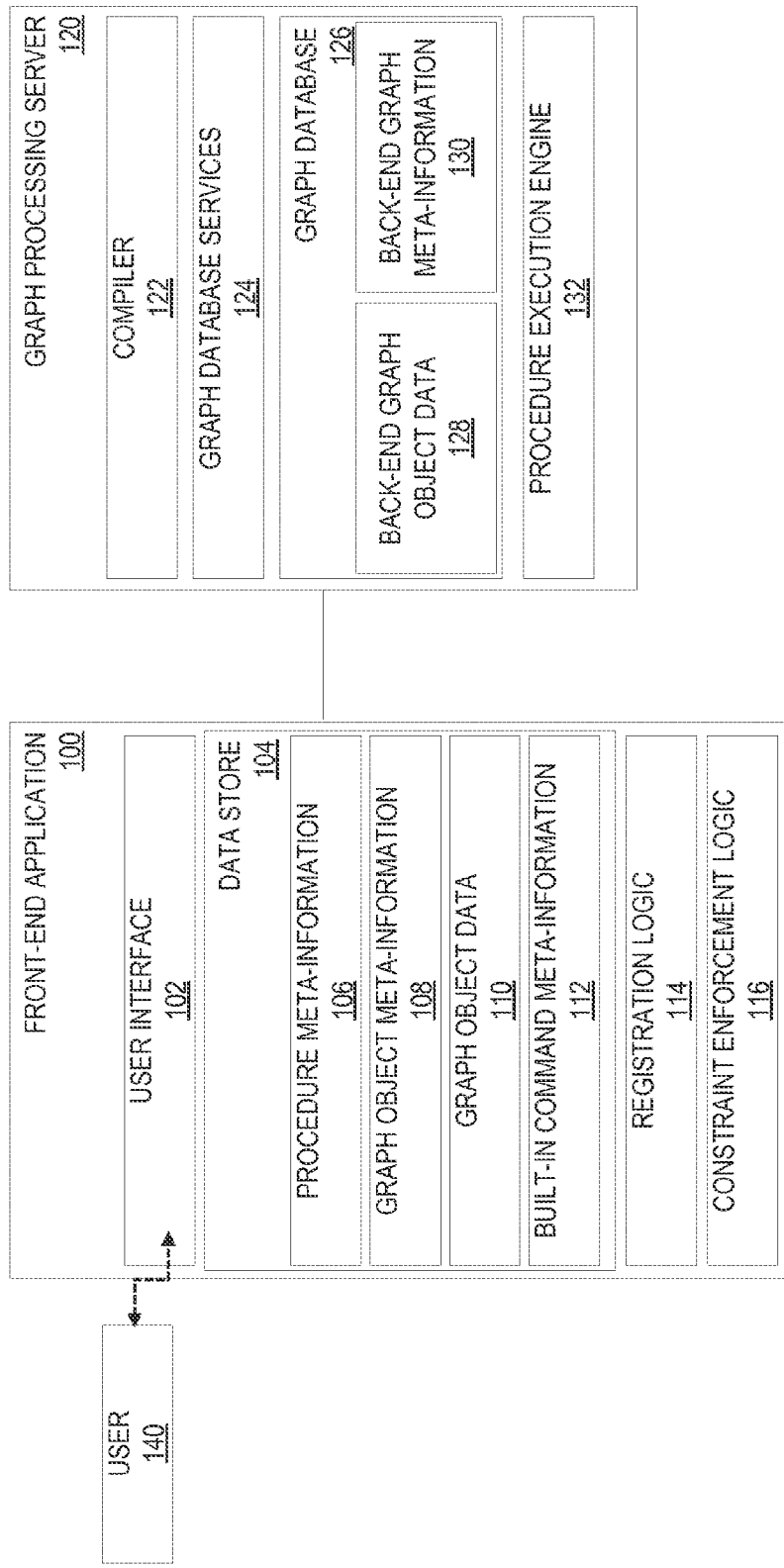
FIG. 1 depicts an example graph analysis system including an interactive front-end that supports built-in and custom graph commands while enforcing constraints.

FIG. 1 depicts an example graph analysis system including an interactive front-end that supports built-in and custom graph commands while enforcing constraints. Front-end application 100 acts as an interface between user 140 and back-end applications executing on graph processing server 120. Front-end application 100 may correspond to a shell application, a presentation layer of a multi-layered application, or some other interface between user 140 and a backend application. Front-end application 100 may execute on the same server/compute node as the back-end application or may execute on a different compute node. If executing on a separate compute node, front-end application may connect to and communicate with the back-end applications over one or more data communication networks, such as the Internet.

Front-end application 100 generally comprises user interface 102, data store 104, registration logic 114, and constraint enforcement logic 116. User interface 102 is configured to receive input from user 140 and to present information for further processing or display. The implementation of user interface 102 may vary from embodiment to embodiment. In some embodiments, user interface 102 may comprise a command line interface (CLI) through which the user may issue commands and view command results through successive lines of text. In other embodiments, user interface 102 may comprise a graphical user interface (GUI) through which a user may interact with GUI objects, such as icons and menus, to issue commands and view command results. In other embodiments, user interface 102 may comprise an application programming interface (API) that defines a set of function inputs and outputs. User 140 may be a human user, such as a data scientist, or a separate application.

Data store 104 stores various meta-information and data that may be used by front-end application during graph analysis. The meta-information and data includes procedure meta-information 106, graph object meta-information 108, graph object data 110, and built-in command meta-information 112. Examples of meta-information and graph object data are given in further detail below. Data store 104 may be implemented in volatile memory, non-volatile memory, or some combination thereof.

Registration logic 114 includes logic for registering custom procedures with front-end application 100. Once registered the custom procedures may be accessed and invoked through front-end application 100. Constraint enforcement logic 116 includes logic for applying a set of constraint rules to custom procedures when they are invoked. Examples constraints that may be applied are given in further detail below. The logic units may be implemented using computer or electrical hardware component(s), firmware, a non-transitory computer readable medium that stores instructions, and/or combinations of these components configured to perform one or more functions or actions as described further herein.

Graph processing server 120 includes a set of back-end applications that support exploratory graph analysis. The back-end applications generally comprise compiler 122, graph database services 124, and procedure execution engine 132. Graph processing server 120 further includes graph database 126, which stores back-end graph object data 128 and back-end graph meta-information 130. Graph processing server 120 may support a variety of functions provided to user 140 through front-end application 100. These functions may include without limitation:

Compilation of graph analytic procedures from high-level languages;
 Management of graph objects;
 Invocation of compiled procedures with graph objects.

Loading Graph Objects

In some embodiments, front-end application 100 provides built-in methods and commands for loading graph objects. A graph object in this context may be a dataset that is organized a set of nodes (also referred to herein as vertices) connected by edges. As an example, a graph object may correspond to unordered pairs of vertices, where each pair set represents an edge within a graph. As another example, a graph object may correspond to a data structure, such as an adjacency list or adjacency matrix, in which a representation of a graph is stored. In an adjacency list of a graph $G=(V, E)$ with vertices V and edges E, the adjacency list is an array of lists, one list for each vertex. The list for each vertex contains the names of all of the vertices adjacent to that vertex. In an adjacency matrix of a graph $G=(V, E)$, the elements are all possible pairs of vertices. If an edge exists between a pair of vertices, the element in the matrix is marked.

A graph object may also be dataset that represents a dependent object within a graph. Example dependent graph objects include Nodes: A graph object is formed from a set of nodes that are connected through edges.
 Node properties: A node may be associated with a set of one or more properties. The properties are arbitrary depending on the particular implementation of the graph. The properties may be associated with a particular data type, such as string, integer, double, etc. Each node property may store a particular property value of the corresponding data type.
 Node collections: A node collection is a group of nodes that belong to one or more graphs. A node collection may comprise a subset of nodes from a particular graph.
 Edges: An edge represents a connection between two nodes within a graph.
 Edge properties: An edge may be associated with a set of one or more properties. For example, in directed graphs, the edge may be associated with a particular direction. As another example, the edge may be associated with a particular weight. As with node properties, the edge property may have a particular data type.

Edge collections: An edge collection is a group of edges that belong to one or more graphs. An edge collection may comprise a subset of edges from a particular graph.

The manner in which graph object are loaded by front-end application 100 may vary from implementation to implementation. In some embodiments, front-end application 100 supports command line interface commands to load graphs. TABLE 1 below depicts an example command for loading a graph object.

:loadGraph path/to/graph_info.json my_graph

TABLE 1

Sample Load Command

The command depicted in TABLE 1 causes front-end application 100 to load a graph object located at the specified path location "path/to/graph_info.json" with the name "my_graph".

In addition or as an alternative to loading the graph through a command line interface, front-end application 100 may provide a GUI for loading graph objects. As an example, user 140 may select a "Load Graph" icon, menu item, or other graphical object. In response, front-end application 100 may open a GUI window that allows user 140 to browse through different directories and select graph objects to load.

Front-end application 100 may support different types of graph objects. Examples of different types of graph objects include, without limitation:
  Directed graphs: A directed graph includes edges that connect nodes, where each edge has an associated direction.
  Undirected graphs: An undirected graph includes a set of edges that connect a set of nodes, where the set of edges has no particular direction.
  Bipartite graphs: A bipartite graph includes nodes that are separated into two different sets such that every edge connects a node that belongs to one set to a node that belongs in the other set.
  Non-bipartite graphs: A non-bipartite graph is any graph that does not satisfy the characteristics of a bipartite graph. For example, an edge may connect nodes that belong to the same set.

When loading a graph object, front-end application 100 receives and/or extracts meta-information about the properties of the loaded graph object. Example meta-information that may be received or extracted may include, without limitation:
  The type of graph: This meta-information indicates whether the graph object represents a directed or undirected graph and whether the graph object represents a bipartite or non-bipartite graph.
  The types of dependent objects in the graph: This meta-information indicates the types of nodes or edges included in the graph object. For example, this meta-information may indicate whether the graph object has self edges (i.e., edges that connect a node to itself) or not, whether the graph object has duplicated edges between the same nodes or not, and whether the graph object includes non-connected nodes or not.
  The data type of value used to identify unique nodes and edges: This meta-information indicates the data type of value is used to index, address, or otherwise identify unique nodes or edges in the graph object. For example, some graph objects may index using integer values while other graph objects may use doubles, strings, or some other data type to index.
  Properties and characteristics of individual nodes and edges within the graph: This meta-information identifies properties and characteristics of nodes and edges that are attached to the graph. As an example, the meta-information may indicate the name of the properties that are associated with a node or edge, the data type of the property, the graph object to which the node or edge belongs, and the mutability of a property value.

Manipulation of Graph Objects

In some embodiments, front-end application 100 provides built-in methods and commands for manipulating a graph object and dependent objects that belong to the graph object. Example operations may include, without limitation, operations for creating, deleting, sorting, and modifying dependent objects that belong to a loaded graph object.

The built-in methods and commands may support operations at different granularities including at the level of individual node/edge properties, individual nodes/edges, or groups of nodes/edges. As an example, user 140 may submit a command to create a new node, a new collection of nodes, or a new node property. In the context of a node property, for instance, user 140 may create a new page rank property (or some other property) for nodes in a graph that model different webpages and set the value based on a page rank function. The node/edge properties may be arbitrary in nature depending on the particular application.

In some embodiments, the manipulations of graph objects may be committed to graph database 126. When a graph object is added, deleted, or otherwise modified via front-end application 100, the change may be propagated to graph database 126. In other embodiments, the manipulations may happen locally within front-end application 100 without modifying back-end graph object data 128 or back-end graph meta-information 130. The change may occur to graph object data 110, which may be performed for exploratory purposes, but is not committed to graph database 126.

TABLE 2 depicts example built-in operations and meta-information maintained for various graph object types, according to some embodiments.

TABLE 2

SAMPLE BUILT-IN OPERATIONS AND COMMANDS

| Graph Object Type | Built-in Operations | Maintained Meta-Information |
|---|---|---|
| Node (Edge) Property | Create node/edge property | Name |
| | Drop node/edge property | Value Type (e.g. int, long, string . . . ) |
| | Set the value of the property for a specific node/edge | How sparse the property is |
| | Get an iterator of nodes/edges, ordered by the value of the specified property | The graph that the property belongs to |
| | Create a (mutable) copy of the property | Mutability of the property (i.e. read-only or not) |
| Node (Edge) Collection | Create node/edge collection | Name |
| | Drop node/edge collection | Collection Type (e.g. set, list, bag . . . ) |
| | Add/Remove an element to/from the collection | The graph that the nodes/edges in the collection belong to |
| | Check the existence of the node in the collection | |
| Node (Edge) | Pick a specific node/edge in the graph by its ID. | The graph that the node/edge belongs to |
| | Pick a random node/edge in the graph. | |
| | Create node/edge | |
| | Drop node/edge | |

As depicted in TABLE 2, each different graph object type is associated with a different set of built-in operations and a different set of meta-information that describes the corresponding graph object. Front-end application 100 may use this meta-information to enforce constraints, such as type checking, as described in further detail below.

Figure 2:
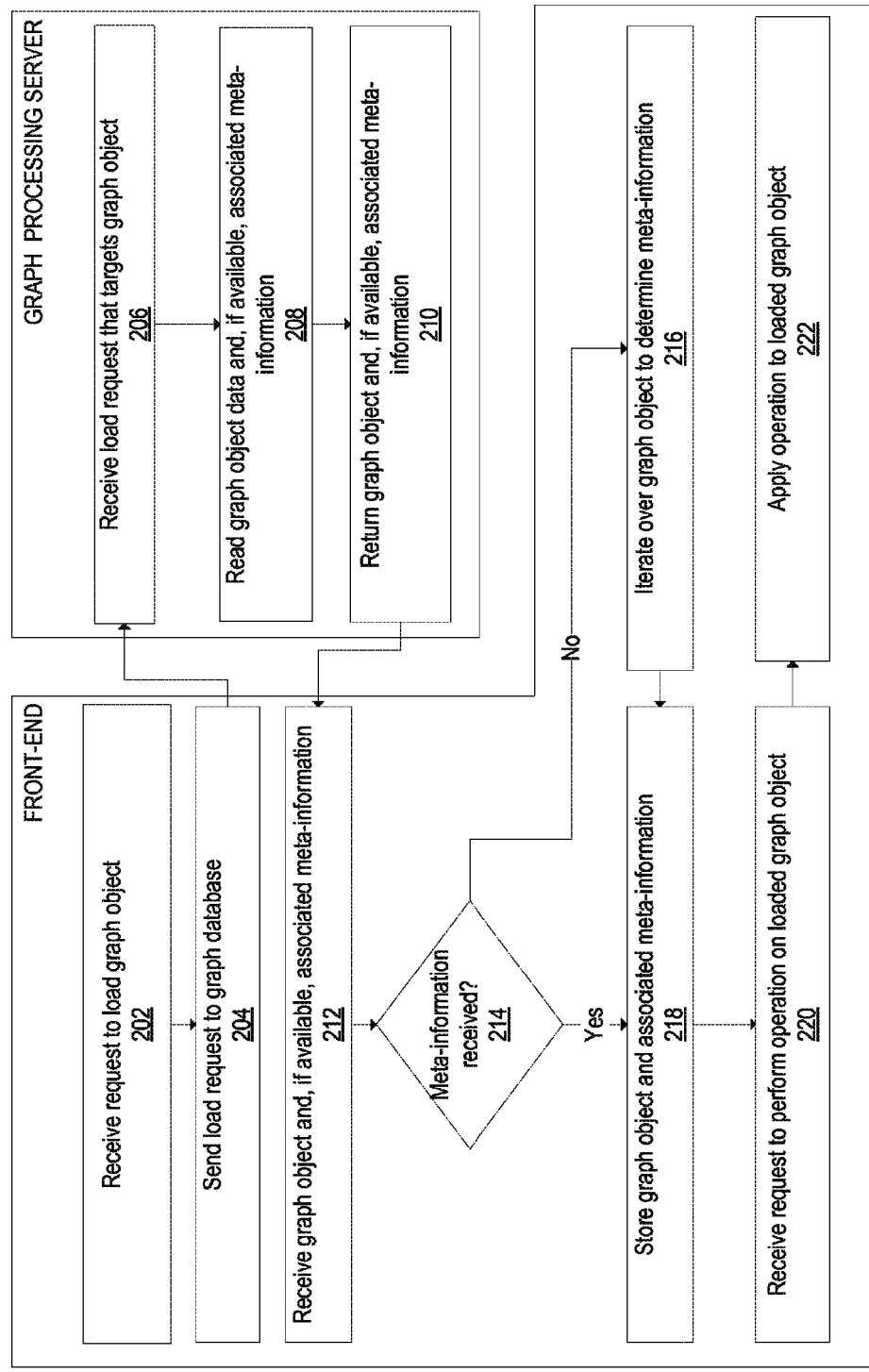
FIG. 2 depicts an example process for loading and manipulating graph data objects using a front-end application.

FIG. 2 depicts an example process for loading and manipulating graph data objects using a front-end application. In step 202, a request is received by front-end application 100 to load a graph object. For example, user 140 may submit a command, such as depicted in TABLE 1, through user interface 102 to load the graph object. Next, in step 204 front-end application 100 sends a request to load the graph object to graph database services 124. When residing on different compute nodes, front-end application 100 may send the request over one or more data communication networks, such as the Internet, in this step. When on the same compute node, front-end application 100 may post a message or otherwise communicate the request to the database application.

In step 206, graph database services 124 receives the request to load the graph object from front-end application 100. In response to receiving the request, graph database services 124 reads the requested graph object data and associated meta-information, if available, from graph database 126. For example, graph database services 124 may retrieve a dataset corresponding to a graph, collection of nodes, collection of edges, individual node, or individual edge. The meta-information may generally identify one or more characteristics of the target graph object. Example meta-information is given in TABLE 2 above. Next, in step 210, graph database services 124 returns the graph object and the associated meta-information, if available.

In step 212, front-end application 100 receives the graph object and, if available, the associated meta-information. Next, in step 214, front-end application 100 determines if the relevant meta-information was received for the received graph object. If the meta-information is not provided by the underlying graph processing system or the meta-information is incomplete, then front-end application 100 may extract the meta-information in step 216 by iterating over the graph object. By iterating over the nodes of a graph, front-end application 100 may determine and generate meta-information such as the following:

The graph is bipartite if each node has either incoming edges or outgoing edges only.

The graph has self edges if there is an edge whose source and destination is the same node.

The graph has duplicated edges if there are two edges whose source nodes are same to each other and destination nodes are same to each other.

The graph has a non-connected node if a node exists whose in-degree and out-degree is 0.

In step 218, front-end application 100 stores the graph object and associated meta-information in data store 104. Once the graph object and associated meta-information is stored, then user 140 may begin graph analysis operations by issuing built-in or custom commands. Thus, in step 220, front-end application 220 receives a request to perform a built-in or custom operation on the graph object. In response, the operation is applied to the loaded graph object at step 222.

Compilation and Registration of Graph Analysis Procedures

In some embodiments, front-end application 100 supports dynamic compilation of graph analysis procedures. User 140 may provide front-end application 100 with source code for the high-level procedure, which are then compiled into a representation executable by front-end application 100 via commands. The compilation and execution of the functions may be performed via front-end application 100 during runtime and without the need to restart front-end application 100.

The format of the source code submitted by user 140 and supported front-end application 100 may vary from implementation to implementation. In some embodiments, the source code may be written in a high-level language, such as a domain-specific language that is specially designed for graph analysis. An example of such a DSL is Green-Marl, although other high-level languages may be supported in addition or as an alternative to Green-Marl.

In some embodiments, front-end application 100 includes a shell that supports command line interface commands to compile graph analysis procedures. TABLE 3 below depicts an example command for compiling a graph analysis procedure.

:compile path/to/my_procedure.gm

TABLE 3

Sample Compile Command

The command depicted in TABLE 3 compiles a graph analysis procedure, the source code for which is stored in the "my_procedure.gm" file.

In addition or as an alternative to compiling a graph analysis procedure through a command line interface, front-end application 100 may provide a GUI for compiling graph analysis procedures. As an example, user 140 may select a "Compile Procedure" icon, menu item, or other graphical object. In response, front-end application 100 may open a GUI window that allows user 140 to browse through different directories and select a graph analysis procedure to compile.

Once a command is submitted to compile a graph analysis procedure, the following events may happen with respect to front-end application 100

Compiler 122 provides meta-information about the compiled graph analysis procedure to front-end application 100.

The graph analysis procedure is registered as an available command within front-end application 100.

The compiled graph analysis procedure becomes executable from within front-end application 100.

In some embodiments, when a graph analysis procedure is registered with front-end application 100, help becomes available for the newly created command. The help may be displayed upon request by user 140 through user interface 102. As an example, TABLE 4 depicts an example structure for a graph analysis procedure with the name "my_proc".

//@ This is the user-provided comment for the following procedure
procedure my_proc (G: Graph, n: Node, weight: edgeProp<double>;
  val: nodeProp<double>)
{
//do some analysis here
. . .
}

TABLE 4

Sample Graph Analytic Procedure Structure

The graph analysis procedure "my_proc" has a signature that defines argument parameters as follows "(G: Graph, n:

Node, weight: edgeProp<double>; val: nodeProp<double>)". The argument parameters include a graph, a node, an edge property, and a node property.

Once a graph analysis procedure with the sample structure in TABLE 4 is compiled, the procedure may become a shell command, which can be invoked in the shell. Using meta-information provided by the compiler and/or user-provided comments about the procedure, the shell may display help messages such as depicted in TABLE 5.

:help my_procedure
[user defined command]
   :my_proc<G:graph> <n:node> <weight:Edge Property (double)> <val: Node Property (double, output)>
*Explanation
   This is the user-provided comment for the following procedure
*Arguments
   Input: G is a directed graph
   Input: n is a node of graph G
   Input: weight is an edge property of graph G whose type is double
   Output: val is a node property of graph G whose type is double
*Return
   void: nothing is returned from the procedure

TABLE 5

Sample Help Message for Compiled Procedure

Upon receiving a request for help targeting a particular graph analysis procedure, front-end application 100 displays an explanation about the procedure based on a user-provided comment. The input and output argument parameters and return value of the procedure are also determined based on the meta-information provided by the compiler and displayed as part of the help message.

Figure 3:
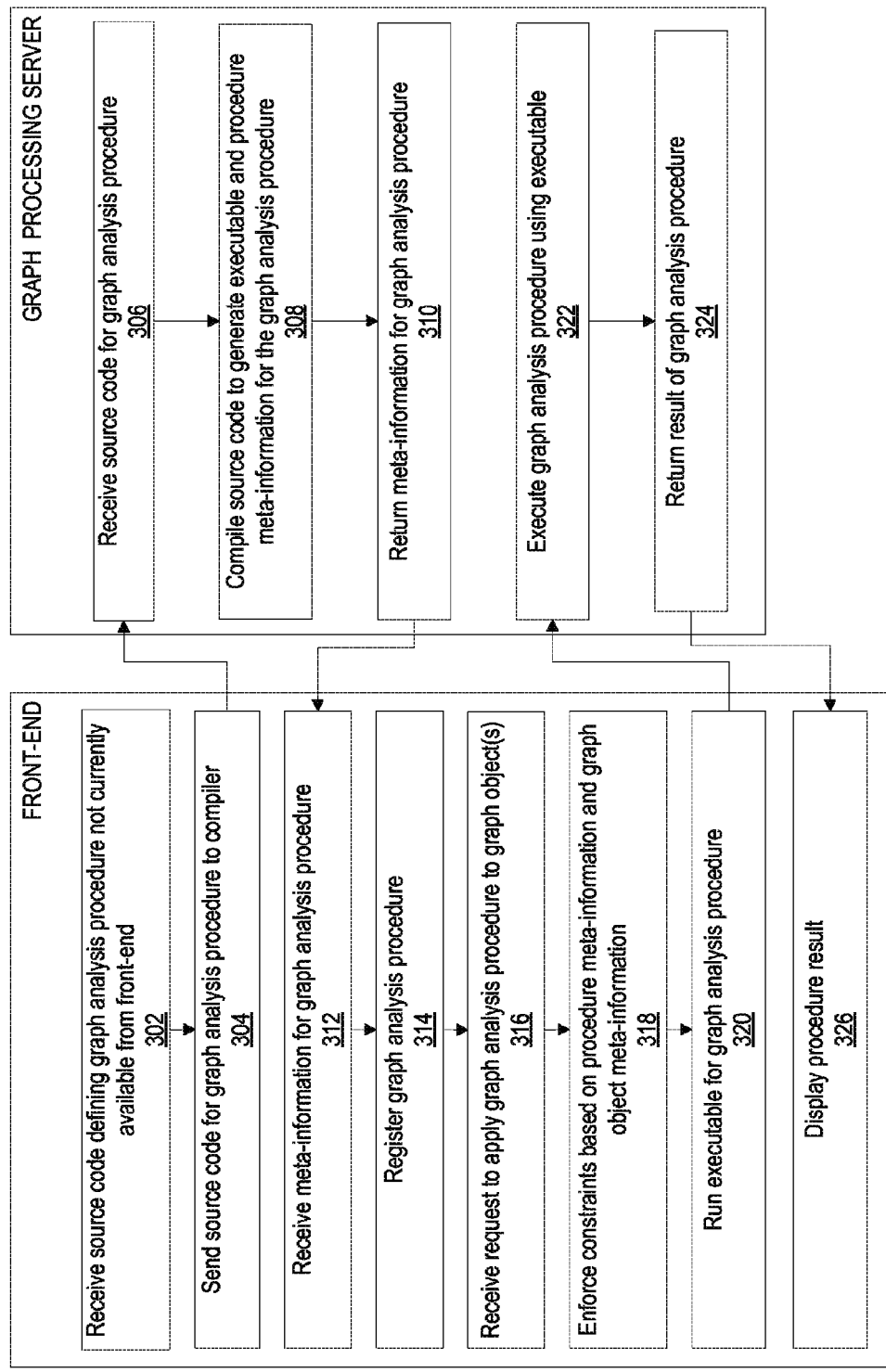
FIG. 3 depicts an example process for registering and invoking custom graph analytic procedures with a front-end application.

FIG. 3 depicts an example process for registering and invoking custom graph analysis procedures with a front-end application. Steps 302 to 314 represent steps for compiling and registering the graph analysis procedure, and steps 316 to 324 represent steps for invoking the graph analysis procedure once compiled. Steps 302 to 314 are discussed in the current section while steps 316 to 324 are discussed in the section below. In some embodiments, the steps may all happen during runtime of front-end application 100 without the need to restart front-end application 100.

In step 302, front-end application 100 receives source code defining a new, custom graph analysis procedure. A "new" procedure in this context is one that is not currently available via front-end application 100. In other words, a command and executable for the new procedure have not been previously registered with front-end application 100 at this step. Next, in step 304, the source code for the graph analysis procedure is sent from front-end application 100 to compiler 122.

In step 306, compiler 122 receives the source code for the graph analysis procedure. Next in step 308, compiler 122 compiles the source code to generate an executable and procedure meta-information for the graph analysis procedure. The manner in which the executable is generated may vary from implementation to implementation. In some embodiments, the generation of the executable may be multi-phased using multiple compilers. For instance, a DSL compiler can generate a program in a different high-level language such as Java first. A second compiler may then be invoked to generate a byte code or binary executable of the graph analysis procedure. The meta-information that is generated by the compiler may also vary from implementation to implementation. Example procedure meta-information may include, without limitation:

- Symbolic names of the input and output argument parameters;
- Symbolic name for the procedure;
- The data types (e.g., graph, node, edge, etc.) and kinds (e.g., directed or non-directed, bipartite or not, etc.) of graph argument parameters;
- The data types of input and output argument parameters;
- For dependent graph objects (nodes/edges, node/edge properties, node/edge collections), the symbolic name of the graph to which the dependent graph object belongs;
- How an argument parameter is used (e.g., as input or output)
- The return data type of the graph analysis procedure; and/or
- Comment(s) that can be used in a help message.

Once the meta-information is generated for the graph analysis procedure, the meta-information is returned to front-end application 100 at step 310. In some cases, the executable may also be returned to front-end application 100, or graph processing server 120 may be responsible for storing and managing the executable, depending on the particular implementation.

In step 312, front-end application 100 receives the meta-information for the graph analysis procedure. Next, in step 314, registration logic 114 registers the graph analysis procedure using the procedure meta-information. Registering the command may include, without limitation, storing the procedure meta-information in data store 104, generating within the front-end's interface a new command for invoking the executable associated with the graph analysis procedure, and generating a help message that identifies a description, argument parameters, and a return value associated with the graph analysis procedure.

In some embodiments, front-end application 100 may load up the compiled binary for a graph analysis procedure during runtime. For instance, a shell application may use Java Reflection and Loader to import compiled byte code. Other applications may also be used to load or reload compiled graph analysis procedures at runtime.

Invocation of Compiled Graph Analysis Procedures

Once a graph analysis procedure is compiled and registered with front-end application 100, user 140 may invoke the graph analysis procedure. For example, user 140 may submit a command through a shell or select a corresponding GUI object to invoke the graph analysis procedure. TABLE 6 below depicts an example shell command for invoking a custom compiled procedure.

:my_proc graph1 node1 weight val

TABLE 6

Sample Command for Invoking a Compiled Procedure

The command invokes the custom procedure with the name "my_proc" and passes the graph entitled "graph1", the node entitled "node1", the edge property "weight" and the node property "val" as arguments for the corresponding argument parameters defined in the graph analysis procedure meta-information.

When invoking the procedure, user 140 specifies which graph objects to use as arguments. As an example, user 140 may select a particular graph, node, edge, node collection, edge collection, node property, or edge property as an argument parameter to apply the graph analysis procedure to one or more graph objects. Other values, such as integers, strings, etc. may be passed as arguments as well, depending on the particular implementation and the argument parameters defined for the invoked graph analysis procedure.

Steps 316 to 326 of FIG. 3 depict example steps for invoking a compiled graph procedure, according to an embodiment. In step 316, a request is received to apply a compiled graph analysis procedure to one or more graph objects. The request may specify the procedure names and arguments as previously indicated. Next, in step 318, constraint enforcement logic 116 performs type-checking and/or other processing to enforce constraints for the compiled procedure. Example constraints that may be enforced may include, without limitation Constraints on which data types may be passed as arguments to a graph analysis procedure;
Constraints relating to mapping identifiers to graph objects; and
Constraints for applying coercion to arguments and argument parameters.

Each of these constraints may be enforced based on the meta-information maintained for the graph objects and for the graph analysis procedure, as described in further detail below. If the constraints encounter an error, then a message may be presented to user 140 indicating the error. Otherwise, the process continues to step 320, and front-end application runs the executable for the graph analysis procedure. Front-end application 100 may run the executable by passing the executable or information that identifies the procedure and the arguments to procedure execution engine 132.

In step 322, procedure execution engine 132 loads the executable and executes the graph analytic procedure using the arguments specified by user 140, thereby applying the graph analysis procedure to one or more graph objects. In some embodiments, procedure execution engine 132 may be an interpreter that processes a bytecode representation of the graph analysis procedure to just-in-time (JIT) compile the procedure. In step 324, procedure execution engine 132 returns the result obtained via execution of the graph analysis procedure to front-end application 100. The result that is returned will vary depending on the particular graph analytic procedure and the arguments. For example, the result may return nodes or edges whose properties satisfy some target value. As another example, the result may include a value derived from applying a function to a set of node property values.

Type Checking at Invocation of Compiled Procedure

Using the meta-information maintained for the graph objects and the graph analysis procedures, front-end application 100 can enforce various type constraints. These constraints may include, without limitation, compatibility checks, mutability checks, and graph belongings checks. Enforcing the type constraints generally involves comparing the meta-information associated with a graph analysis procedure against meta-information for the graph object arguments. Based on the comparison, constraint enforcement logic 116 may determine whether user 140 has invoked a graph analysis procedure in a manner that violates a constraint. If so, an error message may be generated to indicate that a constraint was violated and how the constraint was violated. When an error is raised, front-end application 100 may prevent execution of the graph analysis procedure. If no constraint is violated, then front-end application 100 may cause the graph analysis procedure to be executed based on the received command.

In some embodiments, constraint enforcement logic 116 is configured to perform compatibility checks. For each argument passed to a graph analysis procedure, constraint enforcement logic 116 may check whether there is a compatible type in the underlying interpreter system that executes the graph analysis procedure. As an example, if an integer is passed for a particular argument parameter to the graph analysis procedure, and procedure meta-information 106 indicates that the argument parameter is expecting integer values, then no error is raised. If however, a non-integer value is passed as an argument for the same parameter, constraint enforcement logic 116 may raise an error to warn user 140. In some cases, constraint enforcement logic 116 may perform property coercion if the data types do not match, as described in further detail below.

In some embodiments, constraint enforcement logic 116 is configured to check the compatibility of a graph with a particular graph analysis procedure. Some graph analysis procedures may be defined for specific kinds of the graph—e.g. for undirected graphs, directed, graphs, bipartite graphs, etc. Using the meta-information about the graph and the meta-information about the graph analysis procedure, if the inappropriate graph is given as an argument, the front-end application 100 raises an error. For instance, if user 140 loads a graph object corresponding to a directed graph and invokes a procedure defined for undirected graphs, constraint enforcement logic 116 may compare the meta-information for the graph object and graph analysis procedure to determine that the loaded graph object is incompatible with the invoked procedure. Constraint enforcement logic 116 may generate an error message indicating the incompatibility and prevent execution of the graph analysis procedure.

In some embodiments, constraint enforcement logic 116 is configured to perform immutability checks. To determine whether a property is immutable, compiler 122 provides meta-information about how the argument parameters are used in the procedure—as input or output. Graph object meta-information 108 has information about the mutability of graph objects. As an example, some properties can be set as immutable when loaded from a consistent database. If such an immutable property is given to a procedure as an output argument, the front-end application 100 raises an error.

In some embodiments, constraint enforcement logic 116 is configured to perform checks on the belongings of graph objects. Typically when a procedure involves a graph and a node as input, the node should be a valid node that belongs to the corresponding graph referenced by the graph analysis procedure. As an example, the graph analysis procedure entitled "my_proc", depicted in TABLE 4 above, may specify that the argument received for the node "n" parameter should belong to the graph received for the graph "G" parameter. If the sequence of commands depicted in TABLE 7 below is submitted by user 140, then an error may be raised.

load graph1 and 2
:loadGraph path/to/graph1.json graph1
:loadGraph path/to/graph1.json graph2
pick random node in graph2
:pickRandomNode graph2 node2
Invoke my_proc
:my_proc graph1 node2 weight val
Error: node2 is not a valid node for graph1

TABLE 7

Sample Constraint Enforcement for Graph Belongings

In the sequence of commands depicted in TABLE 7, the node "node2" belongs to "graph2" rather than "graph1". The graph analysis procedure, however, targets graph1 per the arguments passed by the user. Based on the procedure meta-information maintained for my_proc and the graph meta-information maintained for graph1 and graph2, constraint enforcement logic 116 may generate an error message notifies the user that node2 is not a valid node for graph1.

Figure 4A:
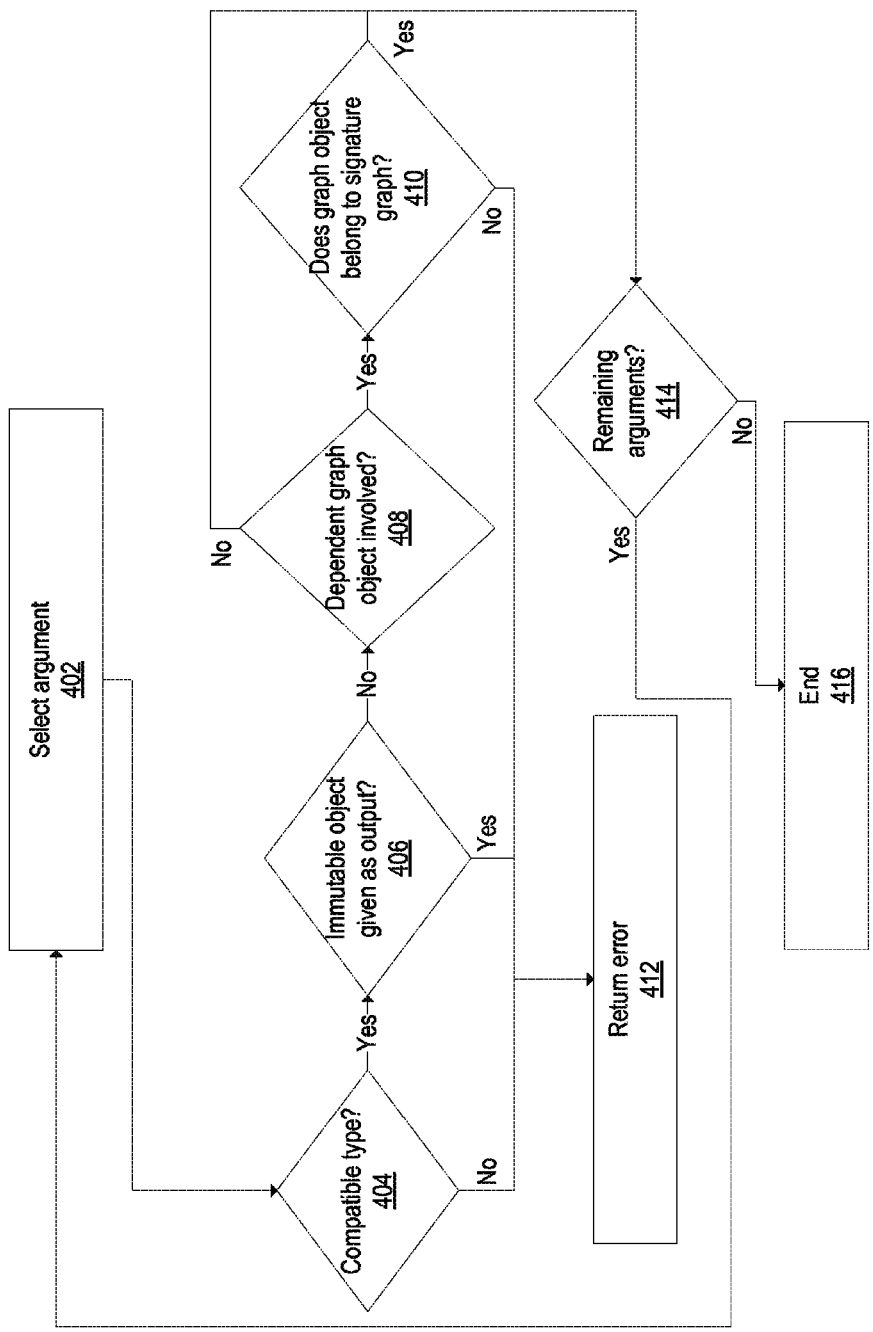
FIG. 4A depicts an example process for enforcing type constraints on an invoked graph analytic procedure.

FIG. 4A depicts an example process for enforcing type constraints on an invoked graph analytic procedure. In step 402 an argument is selected for the graph analysis procedure. As an example, for the "my_proc" procedure depicted in TABLE 7, the argument "graph1", "node2", "weight", or "val" may be selected for type checking A sequence of type checking operations may then be performed for the selected argument as detailed in steps 404 to 410.

In step 404, constraint enforcement logic 116 performs a compatibility check for the selected argument. In the case of "weight", for example, constraint enforcement logic 116 may analyze the procedure meta-information to determine that this argument should be of the data type "double". Constraint enforcement logic 116 may then compare the data type of the argument against the data type of the argument parameter defined in the procedure meta-information. If the data types are compatible, then the process continues to step 406. In some cases, data types may be compatible even if they are not exact matches if property coercion is enabled, as discussed further below. If the data types are not compatible, then the process returns an error at step 412. If the process returns an error, then the process may end or the process may continue checking for other errors depending on the particular implementation. For graph objects, the compatibility check at this step may comprise checking the compatibility of the graph object argument with the graph analysis procedure. For instance, if the user attempts to apply a procedure defined for bipartite graphs to a non-bipartite graph object, then an error may be raised at step 412.

In step 406, constraint enforcement logic 116 determines whether the selected argument is immutable. If the argument is immutable and the graph analysis procedure uses the argument as an output, then an error is raised at step 412. In other words, if a user is trying to change a graph property value that is immutable, front-end application 100 may prevent the operation and generate an error message indicating the reason why the procedure could not be executed. If the argument is not immutable or the corresponding argument parameter is not given as an output per the procedure meta-information, then the process continues to step 408.

In step 408, constraint enforcement logic 116 determines whether the argument corresponds to a dependent graph object. If the argument corresponds to a dependent graph object such as a node or edge, then the process continues to step 410, and constraint enforcement logic 116 performs a belongings check such as described above. If the dependent graph object that is passed to the graph analysis procedure by the user does not belong to the respective graph passed by the user, then the process raises an error at step 412. If a dependent graph object is not involved or the argument passes the belongings check, then the process continues to step 414.

In step 414, constraint enforcement logic 116 determine whether there are any remaining arguments in the graph analysis procedure for which type checking has not yet been performed. If any arguments remain, then the process selects a new argument and repeats for the newly selected argument. If no arguments remain, then the process ends at step 416.

Identifier References to Nodes and Edges

In some embodiments, front-end application 100 stores meta-information about the unique identifier type for nodes and edges of the graph when the graph is loaded. Front-end application 100 may use the meta-information to support references to nodes and edges using node or edge identifier (ID) values of the corresponding ID type. To illustrate, TABLE 7 above depicts a command to apply the graph analysis procedure "my_proc" and references the node object itself "node2". Instead of including a direct reference to the node itself, user 140 may instead reference the node2 using the node ID. The data type of the node ID is stored in the underlying meta-information for the graph to which node2 belongs.

When invoking a procedure, if the node/edge ID value (of the corresponding ID type) is given in place of the node/edge itself, front-end application 100 looks up the node or edge from the ID value to automatically obtain a reference to the node or edge. If the reference exists, front-end application 100 gives the reference as argument to the graph analysis procedure. As an example, in the case of "my_proc" defined above, the node ID type of graph1 is an integer. User 140 may then invoke "my_proc" as indicated below in TABLE 8.

:my_proc graph1 5698 weight val

TABLE 8

Sample Invocation Using Node ID

Upon receiving the command depicted in TABLE 8, front-end-application 100 first looks up the node with ID 5698 and uses the corresponding reference as the argument. If there is no corresponding node, front-end application 100 raises an error.

Figure 4B:
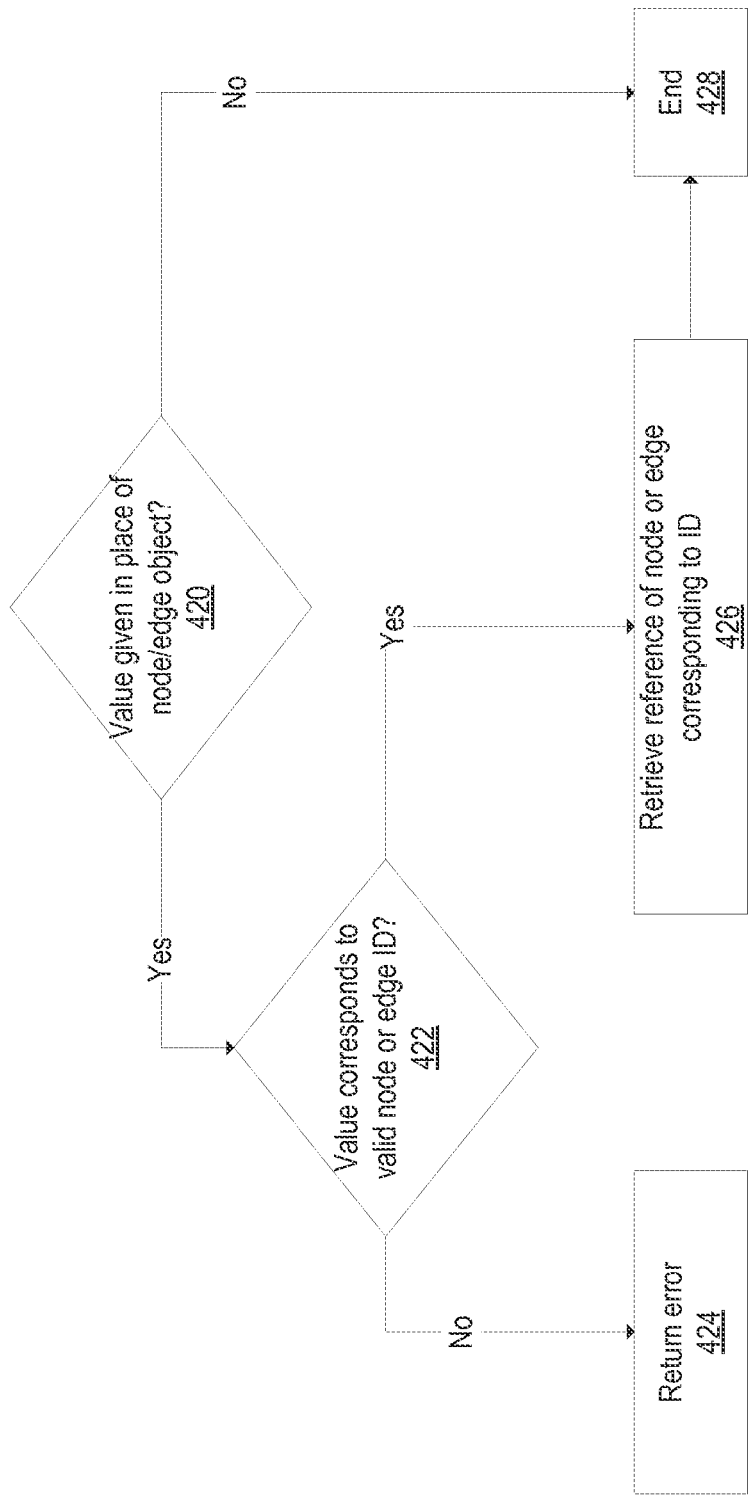
FIG. 4B depicts an example process for performing lookups of graph member objects using identifiers passed to a graph analytic procedure as arguments.

FIG. 4B depicts an example process for performing lookups of graph member objects using identifiers passed to a graph analysis procedure as arguments. In step 420, front-end application 100 determines if a value is given in place of a direct reference to a node or edge object. If not, then the process ends at step 428. If so, then the process continues to step 422. In step 422, front-end application 100 determines whether the value corresponds to a valid node or edge ID. If the data type is invalid or a node or edge does not exist for the given value, then the process branches to step 424, and an error is returned. Otherwise, the process branches to step 426, and front-end application 100 retrieves a reference for the node or edge corresponding to the given ID. The process then ends at step 428, and the graph analysis procedure may be executed using the reference obtained in step 426.

Property Type Coercion

In some cases, constraint enforcement logic 116 may raise a type error if a property with a different value type is given as an argument. For instance, if a double property is given in place of an integer property, a shell may generate and display an error message. However, front-end application 100 may be configured with a "coercion" mode turned on for properties, causing front-end application 100 to apply coercion by creating temporary properties. As an example, if a double property is given in place of an integer property in coercion mode, front-end application 100 may automatically create a temporary property of integer values. Next, front-end application 100 fills up the temporary integer value by applying coercion from double to integer, for every element. Then the temporary property is passed into the procedure instead of the double property originally provided by the user.

A special case for coercion exists when a sparse property is applied in place of a dense property. In this case, front-end application may automatically create a temporary dense property and fill up the value either with the corresponding value from the sparse property (if the value exists) or a null value.

Figure 4C:
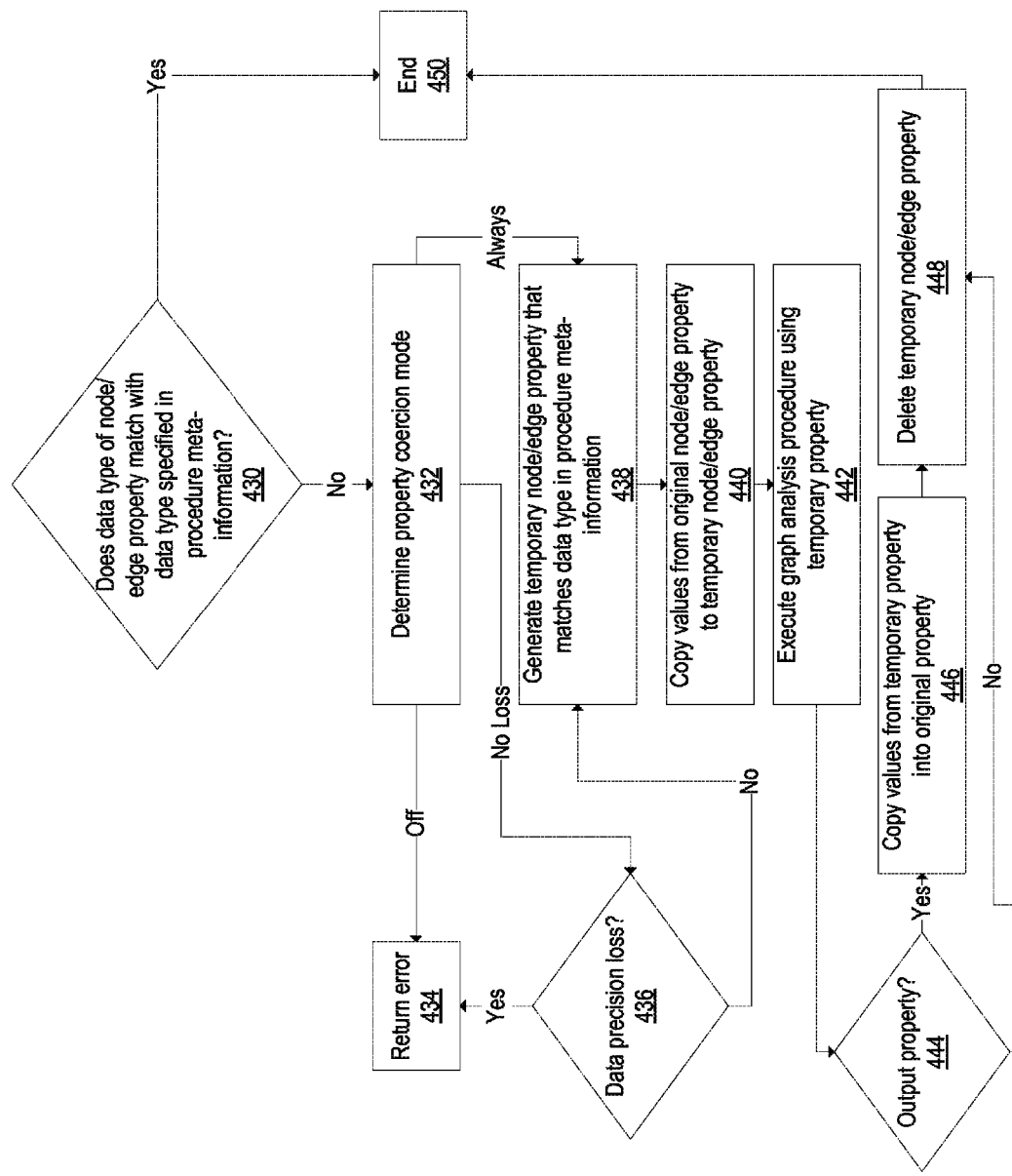
FIG. 4C depicts an example process for enforcing property coercion constraints on an invoked graph analytic procedure.

FIG. 4C depicts an example process for enforcing property coercion constraints on an invoked graph analysis procedure. In step 430, front-end application determines whether the data type of a node or edge property matches the data type specified in the procedure meta-information for the corresponding argument. If so, the no coercion is applied, and the process end at step 450. If not, then the process continues to step 432.

In step 432, front-end application 100 determines the property coercion mode that is currently configured. In some embodiments, front-end application 100 may be configured in one of the following coercion modes:
- Off: In this mode, coercion is never performed. Thus, the process proceeds to step 434 and an error is returned.
- Always: In this mode, coercion is always performed when the data type of the node or edge property does not match with the data type of the signature of the graph analysis procedure. Thus, the process proceeds to step 438, and a temporary node or edge property is generated that matches the data-type in the signature of the graph analysis procedure, which may be determined from the procedure meta-information.
- No loss: In this mode, coercion is performed when there is no data precision loss (e.g., int to a long or double, float to a double) but is not performed when it would result in data precision loss (e.g., double or float to an int). Thus, in this mode, the process continues to step 436, where front-end application 100 determines whether there would be any data precision loss. If so, then the process continues to step 434, and an error is returned. If not, then the process continues to step 438, and front-end application proceeds with coercion.

The current coercion mode of front-end application may be configured by a user or may be set by default, depending on the particular implementation.

In step 440, property coercion proceeds by copying values from the original node or edge property to a temporary node or edge property that matches the data type of the procedure signature. As an example, if user 140 passes a node having an integer value as an argument and the graph analysis procedure signature/meta-information indicates that the corresponding node argument parameter is a double, then front-end application 100 may generate a new, temporary double property for the node. The integer value or the original node provided by the user may then be copied into the temporary double property value. As a special case, if the original property is sparse but the required property is dense, the temporary property is created as a dense property. NULL values (or default values) are filled up for the elements whose property value is not defined in the sparse property.

In step 442, the graph analysis procedure is executed using the temporary property. In the preceding example, for instance, the node property of data type double is passed to the execution engine rather than the original property having an integer value.

In step 444, front-end application 100 determines, based on the procedure meta-information, whether the node/edge property serves as output for the invoked graph analysis procedure. If so, then at step 446, then front-end application 100 copies values from the temporary property back to the original property. Once the values have been copied to the original node or edge property or if the node/edge property does not serve as output, then in step 448, the temporary node or edge property is deleted. The process then ends at step 450.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

The term "logic" as used herein includes computer or electrical hardware component(s), firmware, a non-transitory computer readable medium that stores instructions, and/or combinations of these components configured to perform one or more functions or actions, and/or to cause one or more functions or actions from another logic, method, and/or system. Logic may include a microprocessor controlled by executable code, a discreet logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logic units are described, it may be possible to incorporate the multiple logic units into one physical logic component. Similarly, where a single logic unit is described, it may be possible to distribute the single logic unit between multiple physical logic components.

Figure 5:
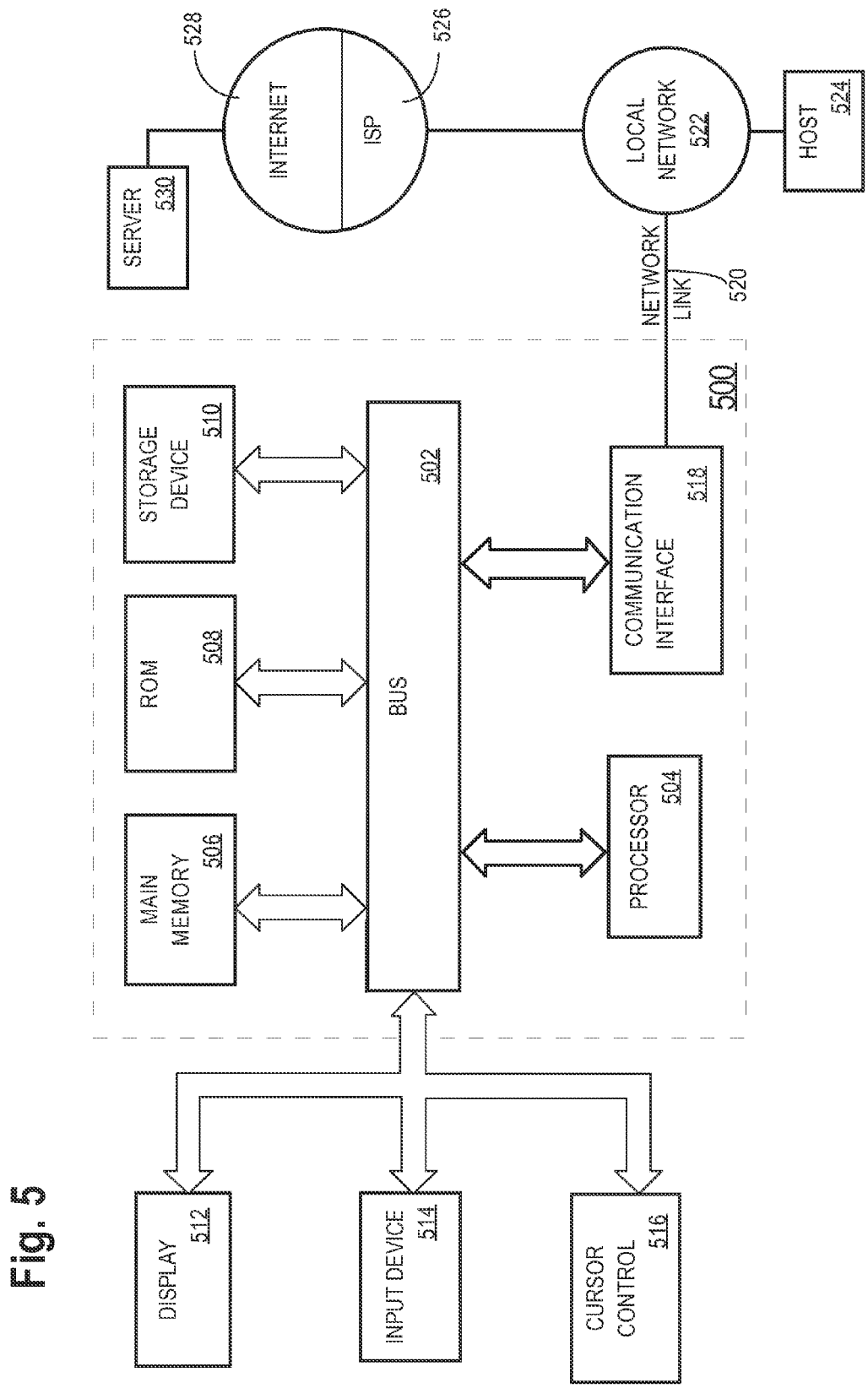
FIG. 5 depicts an example computer system upon which some embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
receiving, by a front-end application from a compiler, first meta-information and an executable for a particular graph analysis procedure;
wherein the first meta-information, identifies a set of one or more input parameters for passing graph information to the particular graph analysis procedure;

storing, by the front-end application, the executable for the particular graph analysis procedure and the first meta-information;

registering, using the first meta-information and after storing the executable, the particular graph analysis procedure as an available command within the front-end application;

receiving, by the front-end application, second meta-information for a set of one or more graph objects;

wherein the second meta-information identifies, for each respective graph object of the set of one or more graph objects, a respective set of graph characteristics;

receiving, by the front-end application, a request to apply the particular graph analysis procedure to the set of one or more graph objects; and in response to receiving the request to apply the particular graph analysis procedure to the set of one or more graph objects, the front-end application performing:

enforcing a set of one or more constraints based on the first meta-information and the second meta-information, and invoking the executable to apply the particular graph analysis procedure to the set of one or more graph objects.

2. The method of claim 1, wherein the method is performed during runtime of the front-end application.

3. The method of claim 1, wherein each respective set of graph characteristics includes a type of graph represented by the respective graph object, node properties for nodes included in the respective graph object, and edge properties for edges included in the respective graph object.

4. The method of claim 1, further comprising:

receiving, by the front-end application before the first meta-information is received from the compiler, source code for the particular graph analysis procedure;

in response to receiving the source code for the particular graph analysis procedure, sending the source code to the compiler for compilation.

5. The method of claim 1, wherein enforcing, by the front-end application, a set of one or more constraints based on the first meta-information and the second meta-information comprises: determining whether a value of a graph property is compatible with a parameter of the set of one or more input parameters.

6. The method of claim 1, wherein enforcing, by the front-end application, a set of one or more constraints based on the first meta-information and the second meta-information comprises:

determining whether the set of one or more graph objects represents a type of graph that is compatible with the particular graph analysis procedure;

generating an error message in response to determining that the set of one or more graph objects represent a type of graph that is not compatible with the particular graph analysis procedure.

7. The method of claim 1, wherein the first meta-information further defines a set of one or more output parameters for the particular graph analysis procedure and wherein enforcing, by the front-end application, a set of one or more constraints based on the first meta-information and the second meta-information comprises generating an error message in response to determining that an immutable property of a graph object is used as an argument for at least one output parameter of the set of one or more output parameters.

8. The method of claim 1, wherein enforcing, by the front-end application, a set of one or more constraints based on the first meta-information and the second meta-information comprises:

determining whether a dependent graph object used as an argument belongs to a graph represented by a particular graph object in the set of one or more graph objects;

generating an error message in response to determining that the dependent graph object does not belong to the graph represented by the particular graph object in the set of one or more graph objects.

9. The method of claim 1, wherein the request to apply the particular graph analysis procedure to the set of one or more graph objects includes an identification value for a dependent graph object; the method further comprising:

based on the second meta-information, retrieving a reference for the dependent graph object.

10. The method of claim 1, further comprising:

performing, by the front-end application, coercion for a particular property of a graph object in the set of one or more graph objects;

wherein performing comprises generating a temporary property that is associated with a different data type than the particular property; and copying values of the particular property of the graph object to the temporary property.

11. One or more non-transitory storage media storing instructions which, when executed by one or more computing devices, cause performance of operations comprising:

receiving, by a front-end application from a compiler, first meta-information and an executable for a particular graph analysis procedure;

wherein the first meta-information, identifies a set of one or more input parameters for passing graph information to the particular graph analysis procedure;

storing, by the front-end application, the executable for the particular graph analysis procedure and the first meta-information;

registering, using the first meta-information and after storing the executable, the particular graph analysis procedure as an available command within the front-end application;

receiving, by the front-end application, second meta-information for a set of one or more graph objects;

wherein the second meta-information identifies, for each respective graph object of the set of one or more graph objects, a respective set of graph characteristics;

receiving, by the front-end application, a request to apply the particular graph analysis procedure to the set of one or more graph objects; and in response to receiving the request to apply the particular graph analysis procedure to the set of one or more graph objects, the front-end application performing:

enforcing a set of one or more constraints based on the first meta-information and the second meta-information, and invoking the executable to apply the particular graph analysis procedure to the set of one or more graph objects.

12. The one or more non-transitory storage media of claim 11, wherein the operations are performed during runtime of the front-end application.

13. The one or more non-transitory storage media of claim 11, wherein each respective set of graph characteristics includes a type of graph represented by the respective graph object, node properties for nodes included in the respective graph object, and edge properties for edges included in the respective graph object.

14. The one or more non-transitory storage media of claim 11,
wherein the instructions further cause operations comprising:
receiving, by the front-end application before the first meta-information is received from the compiler, source code for the particular graph analysis procedure;
in response to receiving the source code for the particular graph analysis procedure, sending the source code to the compiler for compilation.

15. The one or more non-transitory storage media of claim 11, wherein
instructions for enforcing, by the front-end application, a set of one or more constraints based on the first meta-information and the second meta-information comprise instructions for:
determining whether a value of a graph property is compatible with a parameter of the set of one or more input parameters.

16. The one or more non-transitory storage media of claim 11, wherein
instructions for enforcing, by the front-end application, a set of one or more constraints based on the first meta-information and the second meta-information comprise instructions for:
determining whether the set of one or more graph objects represents a type of graph that is compatible with the particular graph analysis procedure;
generating an error message in response to determining that the set of one or more graph objects represent a type of graph that is not compatible with the particular graph analysis procedure.

17. The one or more non-transitory storage media of claim 11, wherein the first meta-information further defines a set of one or more output parameters for the particular graph analysis procedure and wherein instructions for enforcing, by the front-end application, a set of one or more constraints based on the first meta-information and the second meta-information comprise instructions for generating an error message in response to determining that an immutable property of a graph object is used as an argument for at least one output parameter of the set of one or more output parameters.

18. The one or more non-transitory storage media of claim 11, wherein
instructions for enforcing, by the front-end application, a set of one or more constraints based on the first meta-information and the second meta-information comprise instructions for:
determining whether a dependent graph object used as an argument belongs to a graph represented by a particular graph object in the set of one or more graph objects;
generating an error message in response to determining that the dependent graph object does not belong to the graph represented by the particular graph object in the set of one or more graph objects.

19. The one or more non-transitory storage media of claim 11, wherein the request to apply the particular graph analysis procedure to the set of one or more graph objects includes an identification value for a dependent graph object, the instructions further causing operations comprising:
based on the second meta-information, retrieving a reference for the dependent graph object.

20. The one or more non-transitory storage media of claim 11, wherein the instructions further cause operations comprising:
performing, by the front-end application, coercion for a particular property of a graph object in the set of one or more graph objects;
wherein performing comprises generating a temporary property that is associated with a different data type than the particular property; and
copying values of the particular property of the graph object to the temporary property.

* * * * *

UNITED STATES PATENT AND TRADEMARK OFFICE
CERTIFICATE OF CORRECTION

PATENT NO. : 9,575,736 B2  
APPLICATION NO. : 14/805882  
DATED : February 21, 2017  
INVENTOR(S) : Hong et al.

Page 1 of 1

It is certified that error appears in the above-identified patent and that said Letters Patent is hereby corrected as shown below:

On the Title Page

Column 2, item (56) under Other Publications, Line 3, delete "<http://d1.acm.org/citation." and insert -- <http://dl.acm.org/citation. --, therefor.

In the Specification

In Column 8, Line 38, after "100" insert -- : --.

In Column 10, Line 17, after "output)" insert -- ; --.

In Column 13, Line 19, after "checking" insert -- . --.

Signed and Sealed this  
Second Day of October, 2018

Andrei Iancu  
*Director of the United States Patent and Trademark Office*